US012472756B2

(12) United States Patent
Nagaoka

(10) Patent No.: US 12,472,756 B2
(45) Date of Patent: Nov. 18, 2025

(54) PRINTING APPARATUS AND METHOD OF CONTROLLING PRINTING APPARATUS

(71) Applicant: SEIKO EPSON CORPORATION, Tokyo (JP)

(72) Inventor: Minoru Nagaoka, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 157 days.

(21) Appl. No.: 18/393,993

(22) Filed: Dec. 22, 2023

(65) Prior Publication Data

US 2024/0208251 A1 Jun. 27, 2024

(30) Foreign Application Priority Data

Dec. 23, 2022 (JP) ................................ 2022-206323

(51) Int. Cl.
*B41J 11/00* (2006.01)
*B41J 3/407* (2006.01)
*B41J 11/42* (2006.01)

(52) U.S. Cl.
CPC ............ *B41J 11/42* (2013.01); *B41J 3/4075* (2013.01)

(58) Field of Classification Search
CPC ............................ B41J 11/0095; B41J 3/4075
See application file for complete search history.

(56) References Cited

U.S. PATENT DOCUMENTS

2006/0279624 A1* 12/2006 Tsuchiya .............. B41J 11/0095 347/218
2008/0074267 A1 3/2008 Sugiyama

FOREIGN PATENT DOCUMENTS

JP 2005041086 A * 2/2005 ............ B41J 3/4075
JP 2008-77500 A 4/2008

OTHER PUBLICATIONS

Inaba, Machine TranslationofJP-2005041086-A,2005 (Year: 2005).*

* cited by examiner

*Primary Examiner* — Scott A Richmond
(74) *Attorney, Agent, or Firm* — WORKMAN NYDEGGER

(57) ABSTRACT

A printing apparatus includes a control unit configured to perform, after a print request received from an external device is received, based on a detection result of a label end detection unit, a label size determination processing of determining, for a leading label on which an image based on image data included in the print request is printed first, whether a size of the leading label matches a set size set in the print request or not, wherein the control unit, when it is determined by the label size determination processing that the size of the leading label does not match, causes the transport unit to stop transport, and when it is determined by the label size determination processing that the size of the leading label matches the set size, does not perform the label size determination processing on a label subsequent to the leading label.

8 Claims, 10 Drawing Sheets

PRINTING APPARATUS AND METHOD OF CONTROLLING PRINTING APPARATUS

The present application is based on, and claims priority from JP Application Serial Number 2022-206323, filed Dec. 23, 2022, the disclosure of which is hereby incorporated by reference herein in its entirety.

BACKGROUND

1. Technical Field

The present disclosure relates to a printing apparatus and a method of controlling a printing apparatus.

2. Related Art

In the past, there has been known an apparatus for printing an image on a printing surface of a label having an RFID tag.

For example, JP 2008-77500 A discloses an RFID label issuing apparatus including an RFID reader/writer that performs non-contact communication with an RFID tag using wireless communication and writes and reads tag data, and a printing unit that prints label data on a printing surface of an RFID label.

Although information is written to the RFID tag before the label data is printed, a label to which an RFID tag is attached for which information writing fails may be peeled off from a mount before the mount is wound into a roll. When a roll medium that is set in a printing apparatus is a label medium from which some of labels are peeled off, a size of a label detected by the printing apparatus does not match a size of a label set by a print request, and printing may stop.

SUMMARY

The present disclosure is a printing apparatus including a transport unit configured to transport a label medium in which a plurality of labels are attached to a liner along a transport path in a transport direction, a label end detection unit configured to detect an end portion of each of the plurality of labels attached to the label medium transported on the transport path, a printing unit disposed downstream of the label end detection unit in the transport direction and configured to print an image based on image data on each of the plurality of labels, and a control unit configured to perform, after a print request received from an external device is received, based on a detection result of the label end detection unit, a label size determination processing of determining, for a leading label on which the image based on the image data included in the print request is printed first, whether a size of the leading label matches a set size set in the print request or not, wherein the control unit, when it is determined by the label size determination processing that the size of the leading label does not match the set size, causes the transport unit to stop the transport of the label medium, and when it is determined by the label size determination processing that the size of the leading label matches the set size, does not perform the label size determination processing on a label subsequent to the leading label.

The present disclosure is a method of controlling a printing apparatus including a transport step for transporting a label medium in which a plurality of labels are attached to a liner along a transport path in a transport direction, a label end detection step for detecting an end portion of each of the plurality of labels attached to the label medium transported on the transport path, a printing step for, downstream in the transport direction of a position where the end portion of each of the plurality of labels is detected, printing an image based on image data on each of the plurality of labels, and a label size determination step for determining, after a print request received from an external device is received, based on a detection result of the label end detection step, for a leading label on which the image based on the image data included in the print request is printed first, whether a size of the leading label matches a set size set in the print request or not, wherein when it is determined by the label size determination step that the size of the leading label does not match the set size, the transport of the label medium is stopped, and when it is determined by the label size determination step that the size of the leading label matches the set size, the label size determination step is not performed on a label subsequent to the leading label.

DESCRIPTION OF EMBODIMENTS

Embodiments will now be described herein with reference to the accompanying drawings.

1. Configuration of Printing Apparatus

Figure 1:
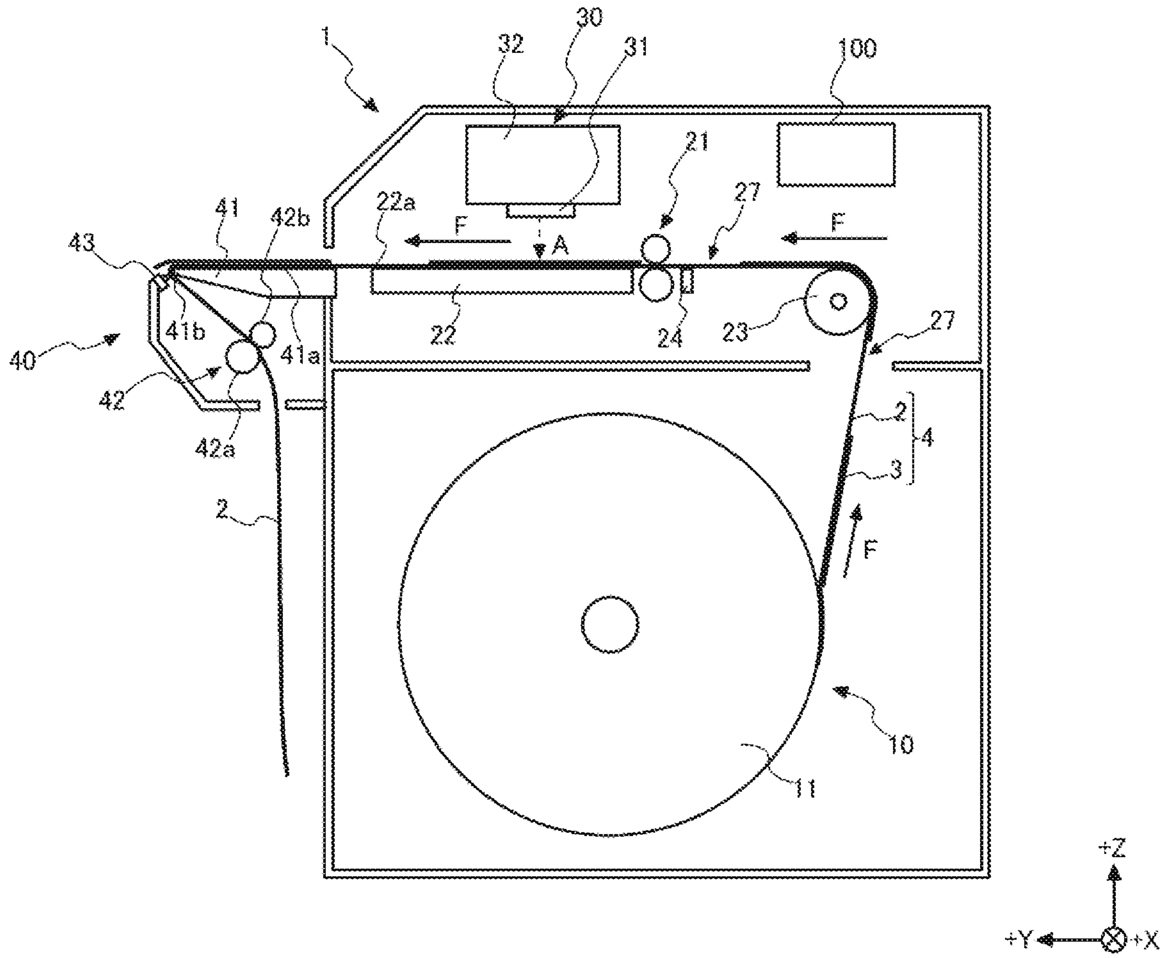
FIG. 1 is a side view schematically illustrating a configuration of a printing apparatus.

FIG. 1 is a side view schematically illustrating a configuration of a printing apparatus 1. A +Z direction illustrated in FIG. 1 corresponds to an upward direction of the printing apparatus 1, a +Y direction illustrated in FIG. 1 corresponds to a frontward direction of the printing apparatus 1, and a +X direction illustrated in FIG. 1 corresponds to a leftward direction of the printing apparatus 1.

The printing apparatus 1 is an ink jet type label printer with a peeler, that performs printing by ejecting ink onto a label paper 4. The printing apparatus 1 includes a supply unit 10, a transport unit 20, a printing unit 30, a peeling unit 40, and a control unit 100.

The supply unit 10 accommodates the label paper 4 before printing. The supply unit 10 is disposed upstream of a printing position A in a transport direction F. A position at which a printing head 31 included in the printing unit 30 ejects ink and performs printing on a label 3 is referred to as the printing position A. Additionally, a direction in which the transport unit 20 transports the label paper 4 fed from the supply unit 10 is referred to as a transport direction F. Further, a path on which the transport unit 20 transports the label paper 4 is referred to as a transport path 27.

The supply unit 10 includes a feeding reel 11 on which the label paper 4 in a roll state is loaded. The feeding reel 11 may be configured such that slight back tension is constantly applied to the label paper 4 so as not to generate slack, in the transport path 27 between the feeding reel 11 and a transport roller 21 included in the transport unit 20. In addition, the printing apparatus 1 may be configured to include a driving motor for performing rotational driving to assist movement of the label paper 4 in accordance with frontward feeding or backward feeding by the transport roller 21.

Figure 2:
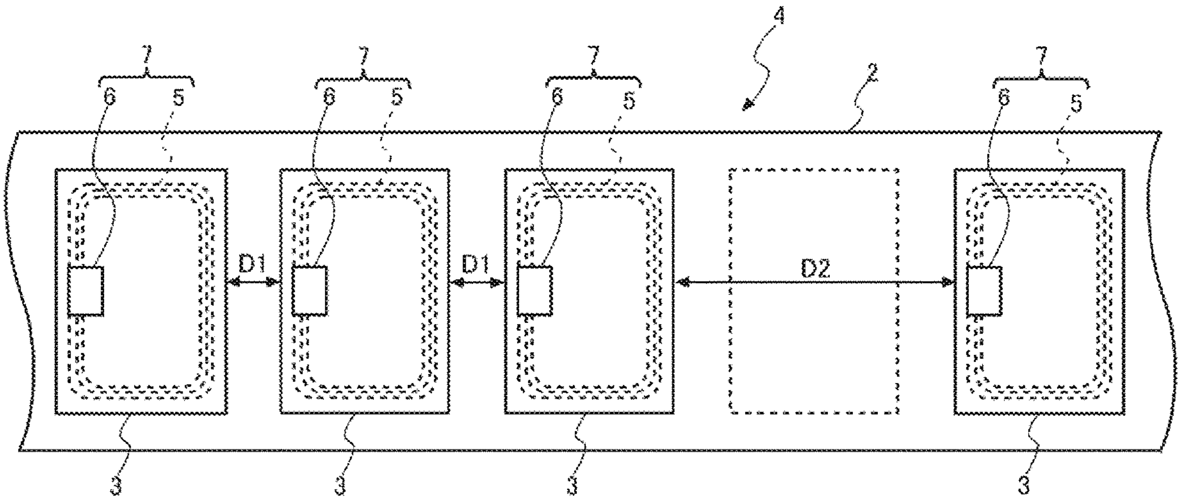
FIG. 2 is a schematic view illustrating a main part of a label paper.

FIG. 2 is a schematic view illustrating a main part of the label paper 4. The label paper 4 corresponds to a label medium.

Here, the label paper 4 accommodated in the supply unit 10 will be described.

The label paper 4 accommodated in the supply unit 10 includes a liner 2, which is a strip-shaped mount, and a plurality of the labels 3 attached so as to be peelable in a longitudinal direction of the liner 2. In each of the plurality of labels 3, an RFID tag 7 including a thin film-shaped IC chip 6 and an antenna 5 is disposed on a back surface side of the label 3 which is a contact surface between the label 3 and the liner 2.

Data is written to the RFID tag 7 by a writing device (not illustrated). The RFID tags 7 include the RFID tag 7 for which data writing fails. Such an RFID tag 7 for which data writing fails is peeled off from the liner 2 by a user's hand before being accommodated in the supply unit 10.

FIG. 2 illustrates a state where the label 3 fourth from the left in view of the drawing is peeled off from the liner 2.

Before the label 3 is peeled off from the liner 2, a distance between the adjacent labels 3 is denoted as a distance D1.

Further, since the label 3 fourth from the left is peeled off, the label 3 fifth from the left becomes the label 3 fourth from the left. A distance between the label 3 third from the left and the label 3 that becomes the fourth from the left due to the peeling is denoted as a distance D2.

When there is the label 3 peeled off from the liner 2, a distance between the adjacent labels 3 may be varied. The distance D2 between the labels 3 located on the left and right sides of the peeled label 3 in view of the drawing is larger than the distance D1 between the labels 3 when no label 3 is peeled.

In addition, the number of labels 3 peeled off from the liner 2 due to writing errors for the RFID tags 7 is not limited to one, and a case is also supposed where data writing fails continuously for the adjacent labels 3. In this case, a distance between the adjacent labels 3 is larger than the distance D2 since the labels 3 for which data writing fails are peeled off.

Referring back to FIG. 1, the configuration of the printing apparatus 1 will be further described.

The transport unit 20 includes a transport roller 21, a platen 22 and a feeding roller 23. The transport roller 21, the platen 22 and the feeding roller 23 are disposed along the transport path 27 on which the label paper 4 is transported. A symbol F illustrated in FIG. 1 indicates the transport direction F in which the label paper 4 is transported.

The transport roller 21 includes a pair of a driving roller that is rotated by a transport motor driven under the control of the control unit 100 to transport the label paper 4, and a driven roller that, together with the driving roller, sandwiches the label paper 4, and rotates in accordance with the rotation of the driving roller. The transport roller 21 is provided upstream of the printing position A in the transport direction F and applies transport force to the label paper 4. By rotating the transport motor forward under the control of the control unit 100, the transport roller 21 transports the label paper 4 in the transport direction F. Further, the transport roller 21 includes a rotary encoder 25 as a sensor that detects a rotation amount of the transport roller 21, that is, a transport amount of the label paper 4. Note that, illustration of the transport roller is omitted.

The platen 22 is a flat plate that faces the printing head 31 at the printing position A and includes a support surface 22*a* that supports the label paper 4 from below.

The feeding roller 23 is a driven roller that feeds the label paper 4 supplied from the supply unit 10, to the printing position A.

A label end detection sensor 24 is disposed upstream of the transport roller 21 in the transport direction F. The label end detection sensor 24 corresponds to a label end detection unit. The label end detection sensor 24 is disposed downstream of the feeding roller 23 and upstream of the transport roller 21 in the transport path 27 of the label paper 4.

The label end detection sensor 24 is a transmission-type sensor that detects an interval between the label 3 and the label 3. The printing apparatus 1, by the control unit 100, detects that a leading end or a trailing end of the label 3 reaches a detection position of the label end detection sensor 24 based on a detection value of the label end detection sensor 24 or a change in the detection value.

The printing unit 30 prints an image based on print data on the label 3 of the label paper 4. The printing unit 30 includes the printing head 31 that ejects ink onto a front surface of the label paper 4, and an ink supply unit 32. The printing head 31 is mounted at a carriage (not illustrated) and is configured by a serial head that ejects ink while moving in a width direction of the label paper 4.

The ink supply unit 32 is a mechanism that supplies ink to be ejected to the printing head 31, and includes an ink container that stores ink, an ink supply path from the ink container to the printing head 31, a pump that sends ink in the ink supply path, and the like. Note that the ink container, the ink supply path and the pump are not illustrated in the drawings.

The peeling unit 40 is located downstream of the printing position A in the transport path 27 of the label paper 4, and peels the liner 2 from the label paper 4 after printing. In other words, the peeling unit 40 is a peeling mechanism that allows the label 3 to be taken out from the liner 2. The peeling unit 40 includes a peeling member 41, a peeling roller 42 and a label sensor 43.

The peeling member 41 is provided so as to protrude frontward the printing apparatus 1. Further, the peeling member 41 is disposed downstream of and close to the platen 22 in the transport path 27. The peeling member 41 includes a guide surface 41*a* that supports the label paper 4 fed frontward from the printing position A from below on an extension of the support surface 22*a* of the platen 22, and a peeling edge 41*a* having an acute angle formed at a downstream leading end of the guide surface 41*b*.

The peeling roller 42 includes a pair of a driving roller 42*a* that is rotated by a driving motor driven under the control of the control unit 100 and transports the liner 2, and a driven roller 42*b* that, together with the driving roller, sandwiches the liner 2, and is rotated in accordance with the rotation of the driving roller. The peeling roller 42 is disposed below the peeling member 41, and transports the liner 2 in a direction that is bent at an acute angle by the peeling edge 41*b* of the peeling member 41. That is, the peeling roller 42 can apply tension for peeling the liner 2 from the label 3 in the peeling unit 40 to the liner 2, and applies transporting force to the peeled liner 2. The driving motor is not illustrated.

The label sensor 43 is a reflective-type optical sensor that detects presence or absence of the label 3 that floats after the liner 2 is peeled off by the peeling edge 41*b*, and is provided in a vicinity of the peeling edge 41*b*. When the label sensor 43 detects the label 3 peeled off from the liner 2 and floating, the label sensor 43 outputs a signal notifying the control unit 100 of the detection of the label 3.

2. Configuration of Control System

Figure 3:
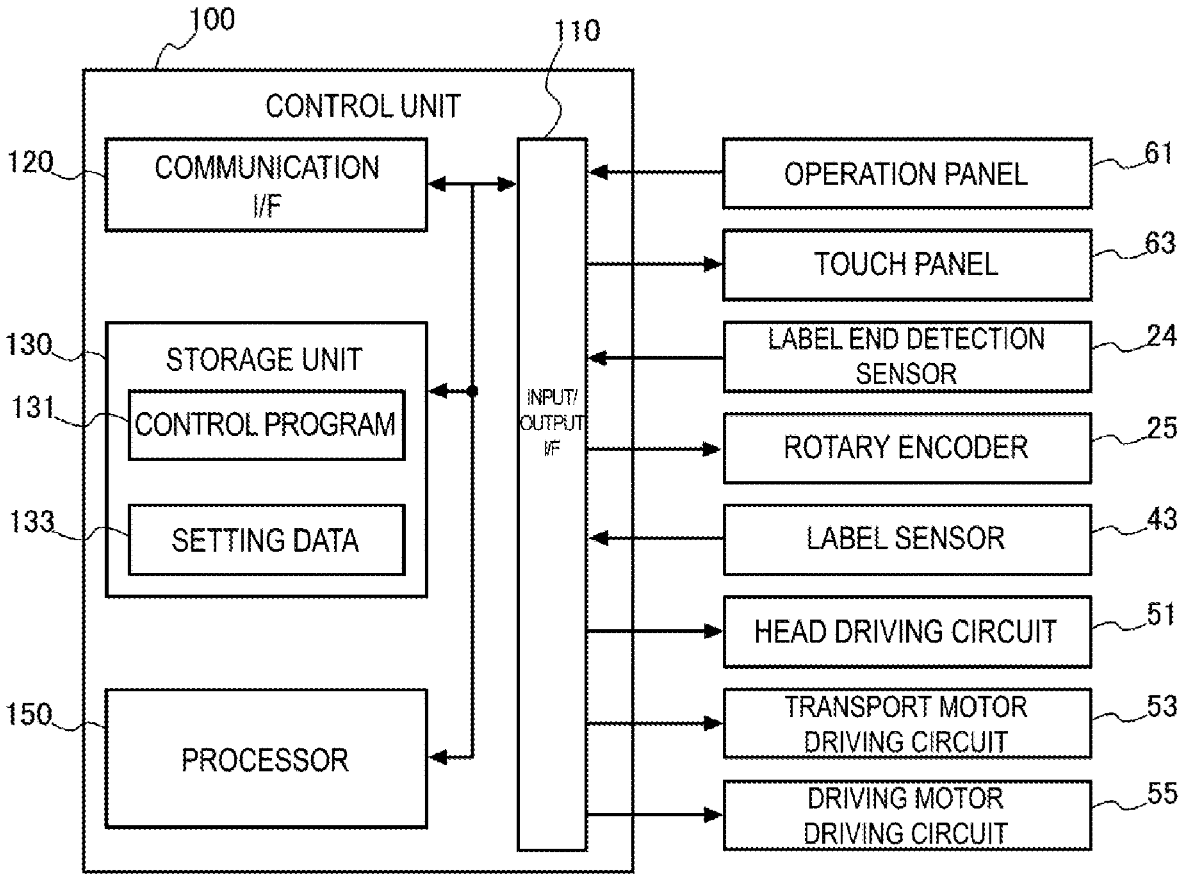
FIG. 3 is a block diagram illustrating a configuration of a control system.

FIG. 3 is a diagram illustrating a configuration of a control system of the printing apparatus 1.

The configuration of the control system of the printing apparatus 1 will be described with reference to FIG. 3.

The control unit 100 includes an input/output interface 110, a communication interface 120, a storage unit 130 and a processor 150. Hereinafter, interface will be abbreviated as I/F.

The input/output I/F 110 includes an interface circuit to which data output from functional units coupled to the control unit 100 is input, and an interface circuit that outputs data transmitted from the control unit 100 to the functional units. The functional units coupled to the control unit 100 include an operating panel 61, a touch panel 63, the label end detection sensor 24, the rotary encoder 25, the label sensor 43, a head driving circuit 51, a transport motor driving circuit 53 and a driving motor driving circuit 55.

The operating panel 61 includes buttons such as a power button for switching on and off of a power supply of the printing apparatus 1, and a setting button for setting operation of the printing apparatus 1.

The touch panel 63 corresponds to a reception unit. The touch panel 63 includes, for example, a display panel configured by a liquid crystal panel or an organic electroluminescence (EL) panel, and a touch sensor that detects a touch operation on the display panel. Various types of information such as error information and print settings are displayed on the touch panel 63 under the control of the control unit 100. Further, the touch panel 63 detects a user's touch operation. In the touch panel 63, a coordinate system is set in advance, and when a user's touch operation is detected, the touch panel 63 outputs coordinate information indicating a position of the detected touch operation to the control unit 100.

The rotary encoder 25 detects a rotation amount of the transport motor that drives the transport roller 21. The rotary encoder 25 outputs a signal indicating the detected rotation amount of the transport motor to the control unit 100. The control unit 100 detects a transport amount of the label paper 4 based on the signal input from the rotary encoder 25. The rotary encoder 25 and the control unit 100 correspond to a transport amount detection unit.

The head driving circuit 51 is a circuit that is coupled to the printing head 31, and drives the printing head 31. The head driving circuit 51 controls a driving voltage supplied to a solenoid coil (not illustrated) included in the printing head 31.

The transport motor driving circuit 53 drives the transport motor that drives the transport roller 21 to rotate the transport roller 21, and transports the label paper 4 in the transport direction F.

The driving motor driving circuit 55 drives a driving motor (not illustrated) to move the carriage at which the printing head 31 is mounted in a sub-scanning direction which is the width direction of the label paper 4.

The communication I/F 120 is coupled to a communication I/F included in a host device which is an external device. The host device and the communication I/F included in the host device are not illustrated.

The communication I/F 120 performs two way data communication and receives a print request transmitted from the host device. The communication I/F 120 may be directly coupled to the communication I/F of the host device by a cable, may be coupled via a network, or may be coupled by wireless communication.

The storage unit 130 includes a random access memory (RAM) as a volatile semiconductor storage device, and includes a read only memory (ROM) as a nonvolatile semiconductor storage device.

The RAM is used as a calculation region of the processor 150.

The ROM stores a control program 131 executed by the processor 150 and setting data 133. The setting data 133 is data relating to operation settings of the printing apparatus 1.

The processor 150 is an arithmetic processing device configured by a central processing unit (CPU) or a micro processing unit (MPU). The processor 150 controls each unit of the printing apparatus 1 by executing the control program 131. The processor 150 may be configured by a single processor or by a plurality of processors.

The control unit 100 determines whether a print request is received from the host device via the communication I/F 120 or not. The print request includes image data that is a source of an image to be printed on the label paper 4, the number of prints on which the image based on the image data is printed, and a set size that specifies a size of the label 3 on which the image is to be printed.

Upon receiving a print request, the control unit 100 starts generation of print data for each print to be issued, based on image data included in the received print request. The print data is data obtained by applying processing such as resolution conversion processing, color conversion processing, halftone processing, rasterization processing and command addition processing to the image data.

The control unit 100 clears a count value of a counter with zero before starting printing on the label paper 4. The counter is a counter for counting the number of labels 3 on which the print data is printed. After the value of the counter is cleared with zero, the control unit 100 causes the counter to count 1 to set the value of the counter to "1". Hereinafter, the count value is referred to as a count value k.

Next, the control unit 100 performs label size determination processing and transport amount determination processing.

The label size determination processing is processing of determining whether a size of the label 3 calculated based on a detection result of the label end detection sensor 24 matches a set size or not before printing processing of printing an image based on a print data on the label 3 is started.

The transport amount determination processing is processing of determining whether a transport amount of the transport unit 20 until the label end detection sensor 24 detects a leading end of the label 3 is less than a preset transport amount or not.

First, the label size determination processing will be described.

When the count value k of a counter is "1", the control unit 100 performs the label size determination processing.

That is, after a print request is received, the control unit 100 performs the label size determination processing on the leading label 3 which is the label 3 on which the print data based on the print request is printed first. Hereinafter, the leading label 3 is denoted as a first label 3.

The control unit 100 calculates a size of the label 3 transported on the transport path 27, based on detection results of the label end detection sensor 24 and the rotary encoder 25. The calculated size of the label 3 is a length in the transport direction of the label 3.

Specifically, the control unit 100 calculates the size of the label 3 based on a rotation amount of the rotary encoder 25 detected during a period from when the label end detection sensor 24 detects a leading end of the first label 3 to when the label end detection sensor 24 detects a leading end of a second label 3 subsequent to the first label 3.

After the size of the label 3 is calculated based on the detection results of the label end detection sensor 24 and the rotary encoder 25, the control unit 100 determines whether the calculated size of the label 3 matches a set size or not. When the calculated size of the label 3 does not match the set size, the control unit 100 determines a determination result of the label size determination processing as "error found". The control unit 100 that determines the determination result of the label size determination processing as "error found" stops the driving of the transport unit 20 and the transport of the label paper 4.

When the size of the label 3 calculated based on the detection results of the label end detection sensor 24 and the rotary encoder 25 matches the set size, the control unit 100 determines the determination result of the label size determination processing as "no error".

When the control unit 100 determines the determination result of the label size determination processing as "no error" for the first label 3, the label size determination processing is not performed on the second label 3, a third label, . . . , and an n-th label 3 subsequent to the first label 3. n is a natural number equal to or greater than 2.

As a result, when a user intentionally peels off the label 3 from the liner 2 due to an error in writing data to the RFID tag 7, it is possible to reduce occurrence of an event in which the determination result of the label size determination processing is "error found" and the printing of the label is stopped in the middle.

The case where the label size determination processing is not performed on the n-th label 3 subsequent to the first label 3 will be described more specifically. The case where the label size determination processing is not performed on the n-th label 3 includes the following three aspects.

In a first aspect, the control unit 100 performs the label size determination processing on the labels 3 subsequent to the second label 3. When it is determined based on the count value k of the counter that the label 3 to be subjected to the label size determination processing is the second label 3 or a subsequent label, the control unit 100 does not determine as "error found" even when the label size determination processing has an error, and determines as "no error".

Also in a second aspect, the control unit 100 performs the label size determination processing on the second label 3 and subsequent labels. When it is determined based on the count value k of the counter that the label 3 to be subjected to the label size determination processing is the second label 3 or a subsequent label, the control unit 100 outputs nothing as the determination result of the label size determination processing. Further, when the determination result of the label size determination processing is not "error", the control unit 100 outputs "no error" as the determination result of the label size determination processing, and when the determination result of the label size determination processing is "error", the control unit 100 does not output the determination result of the label size determination processing.

The processor 150 cannot transit to the next processing unless a processing result of the label size determination processing performed as a subroutine is input. However, in the second aspect, when the determination result of the label size determination processing is not input even after a predetermined time elapses, the processor 150 determines as "no error" and performs the next processing.

In a third aspect, even when it is determined that the label 3 to be processed is the second label 3 or a subsequent label based on the count value k of the counter, the control unit 100 performs the label size determination processing. The processor 150 determines as "no error" regardless of whether a result of "no error" or "error" is returned as the result of the label size determination processing which is a main routine, and performs the next processing.

Next, the transport amount determination processing will be described.

The transport amount determination processing includes first transport amount determination processing and second transport amount determination processing.

The first transport amount determination processing is processing of determining a transport amount until the label end detection sensor 24 detects a leading end of the first label 3. More specifically, the first transport amount determination processing determines a transport amount from when the transport unit 20 is driven to start transport of the label paper 4 after a print request is received from the host device to when the label end detection sensor 24 detects a leading end of the first label 3.

When the label end detection sensor 24 cannot detect the leading end of the first label 3 although the transport amount from the start of the transport of the label paper 4 by driving the transport unit 20 becomes equal to or greater than a first transport amount, the control unit 100 determines a determination result of the first transport amount determination processing as "error found".

The first transport amount can be set to a freely selected transport amount. For example, when a predetermined number of successive labels 3 are peeled off, the first transport amount may be set to a transport amount from when a leading end of the label 3 one before the predetermined number of labels 3 that are peeled off is detected to when a leading end of the label 3 one after the predetermined number of labels 3 that are peeled off is detected. Further, the first transport amount may be set to a maximum size of one label 3. In addition, the predetermined number may be set to, for example, the number of RFID tags 7 for which writing errors of data may occur continuously.

The second transport amount determination processing is processing of determining a transport amount from when the label end detection sensor 24 detects a leading end of the n-th label 3 to when a leading end of an (n+1)-th label 3 that follows is detected.

When the label end detection sensor 24 cannot detect the leading end of the (n+1)-th label 3 although a transport amount from detection of the leading end of the n-th label 3 by the label end detection sensor 24 becomes equal to or greater than a second transport amount, the control unit 100 determines a determination result of the second transport amount determination processing as "error found".

When a predetermined number of successive labels 3 are peeled off, the second transport amount may also be set to a transport amount from when a leading end of the label 3 one before the predetermined number of labels 3 that are peeled off is detected to when a leading end of the label 3 one after the predetermined number of labels 3 that are peeled off is detected. Further, the second transport amount may be set to the maximum size of one label 3. Further, the second transport amount may be set to the same value as the first transport amount, or the second transport amount may be set to be greater than or less than the first transport amount.

In addition, two thresholds of the second transport amount and a third transport amount may be used as threshold values for the transport amount used in the determination of the second transport amount determination processing.

For example, the second transport amount is used as a threshold value for determining a transport amount of the first label 3, based on a transport amount from when the label end detection sensor 24 detects a leading end of the first label 3 to when the label end detection sensor 24 detects a leading end of the second label 3.

Further, the third transport amount is used as a threshold value for determining a transport amount of the n-th label 3, based on a transport amount from when the label end detection sensor 24 detects a leading end of the n-th label 3 to when the label end detection sensor 24 detects a leading end of the (n+1)-th label 3.

Since the label size determination processing is also performed on the first label 3, a transport amount corresponding to the size of the label 3 is used as the second transport amount.

Further, since the label size determination processing is not performed on the labels 3 other than the first label 3, a transport amount having a greater value than the second transport amount may be used as the third transport amount.

Figure 4:
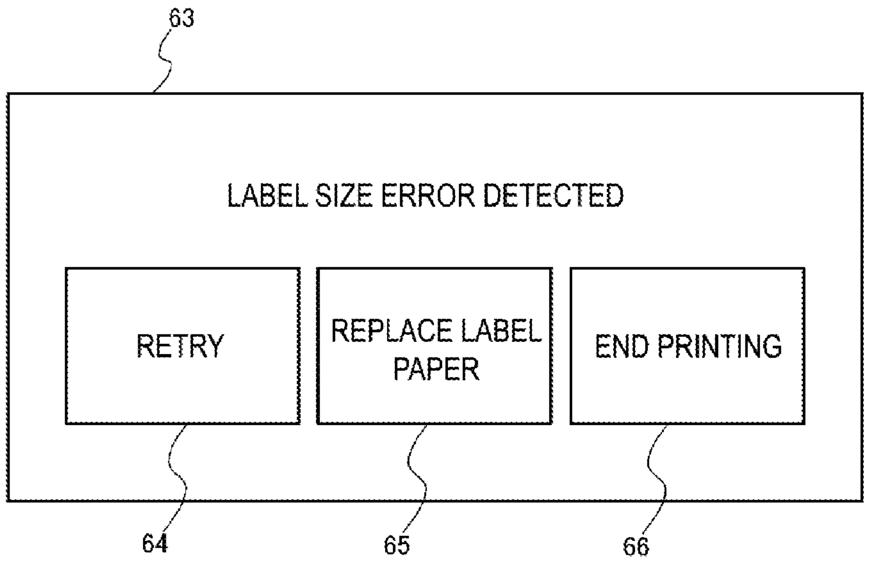
FIG. 4 is a diagram illustrating a display example of a touch panel.

FIG. 4 is a diagram illustrating an example of an error display displayed on the touch panel 63.

When the control unit 100 determines one of the checks of the label size determination processing and the transport amount determination processing as "error", the control unit 100 causes the error display illustrated in FIG. 4 to be displayed on the touch panel 63. The error display includes, for example, information indicating whether the processing in which the error is detected is the label size determination processing or the transport amount determination processing. Further, on the touch panel 63, a retry button 64, a replacement button 65 for instructing replacement of the label paper 4, and a print end button 66 for instructing printing end are displayed.

Figure 5:
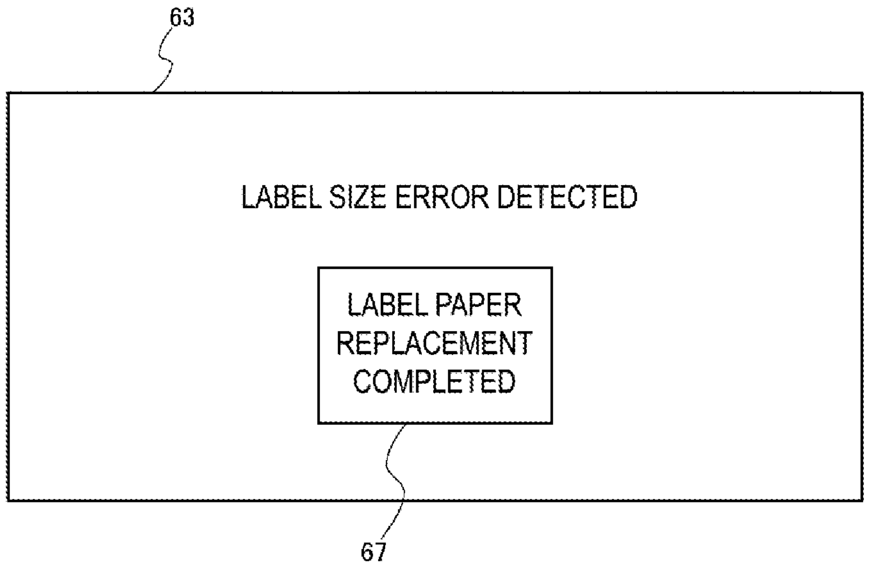
FIG. 5 is a diagram illustrating a display example of the touch panel.

FIG. 5 is a diagram illustrating an example of the error display displayed on the touch panel 63.

In particular, FIG. 5 is a diagram illustrating an example of information displayed on the touch panel 63 when the replacement button 65 is pressed.

When the replacement button 65 illustrated in FIG. 4 is pressed, the control unit 100 causes a replacement completion button 67 illustrated in FIG. 5 to be displayed on the touch panel 63.

The replacement completion button 67 is a button pressed by a user when the replacement of the label paper 4 accommodated in the supply unit 10 is completed.

When the retry button 64 illustrated in FIG. 4 is pressed or when the replacement completion button 67 illustrated in FIG. 5 is pressed, the control unit 100 resumes the driving of the transport unit 20 to resume the transport of the label paper 4, and performs the label size determination processing and the transport amount determination processing again. Further, when the print end button 66 is pressed, the control unit 100 ends the printing processing.

3. Operation of Printing Apparatus

Figure 6:
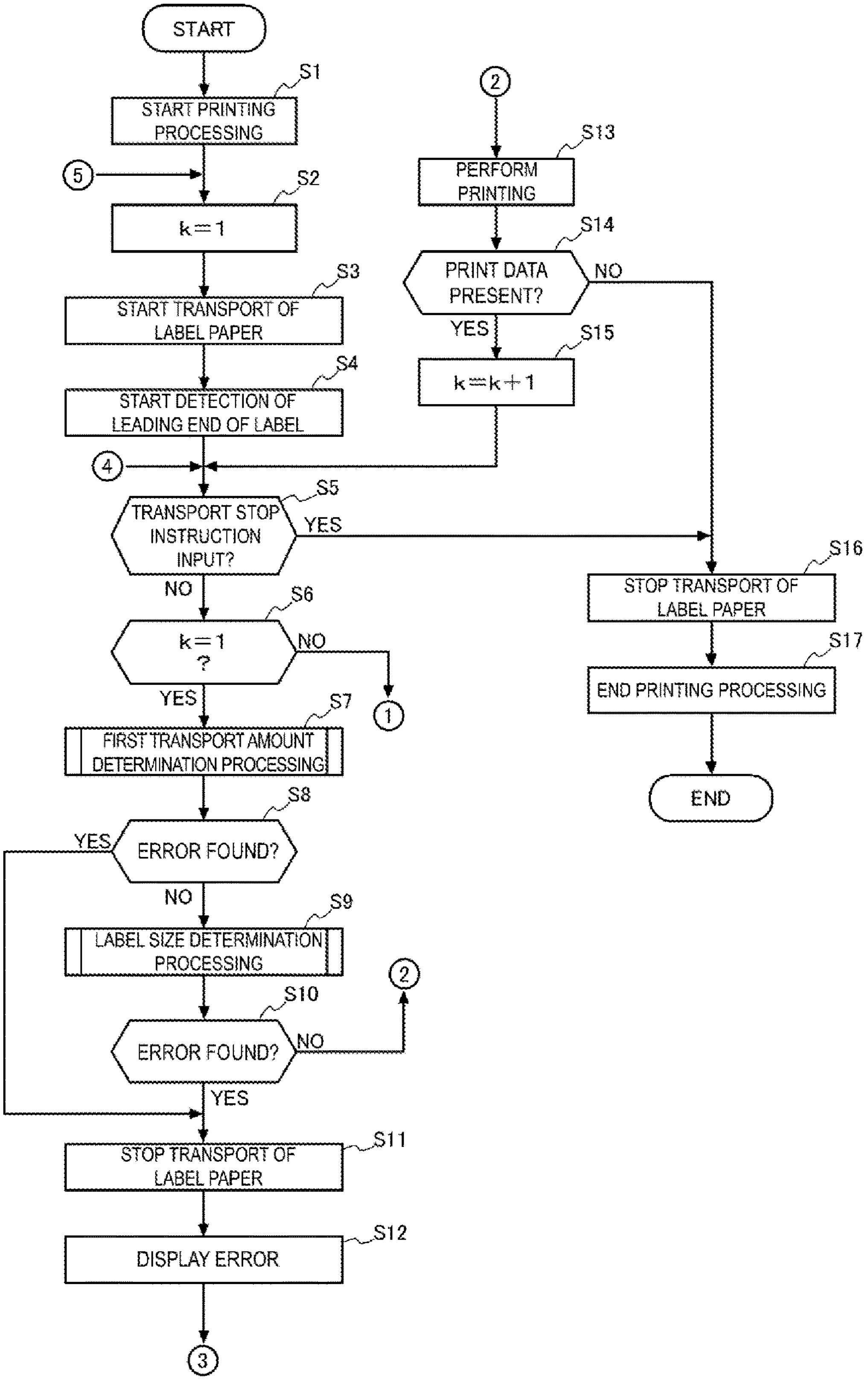
FIG. 6 is a flowchart illustrating operation of the printing apparatus.
Figure 7:
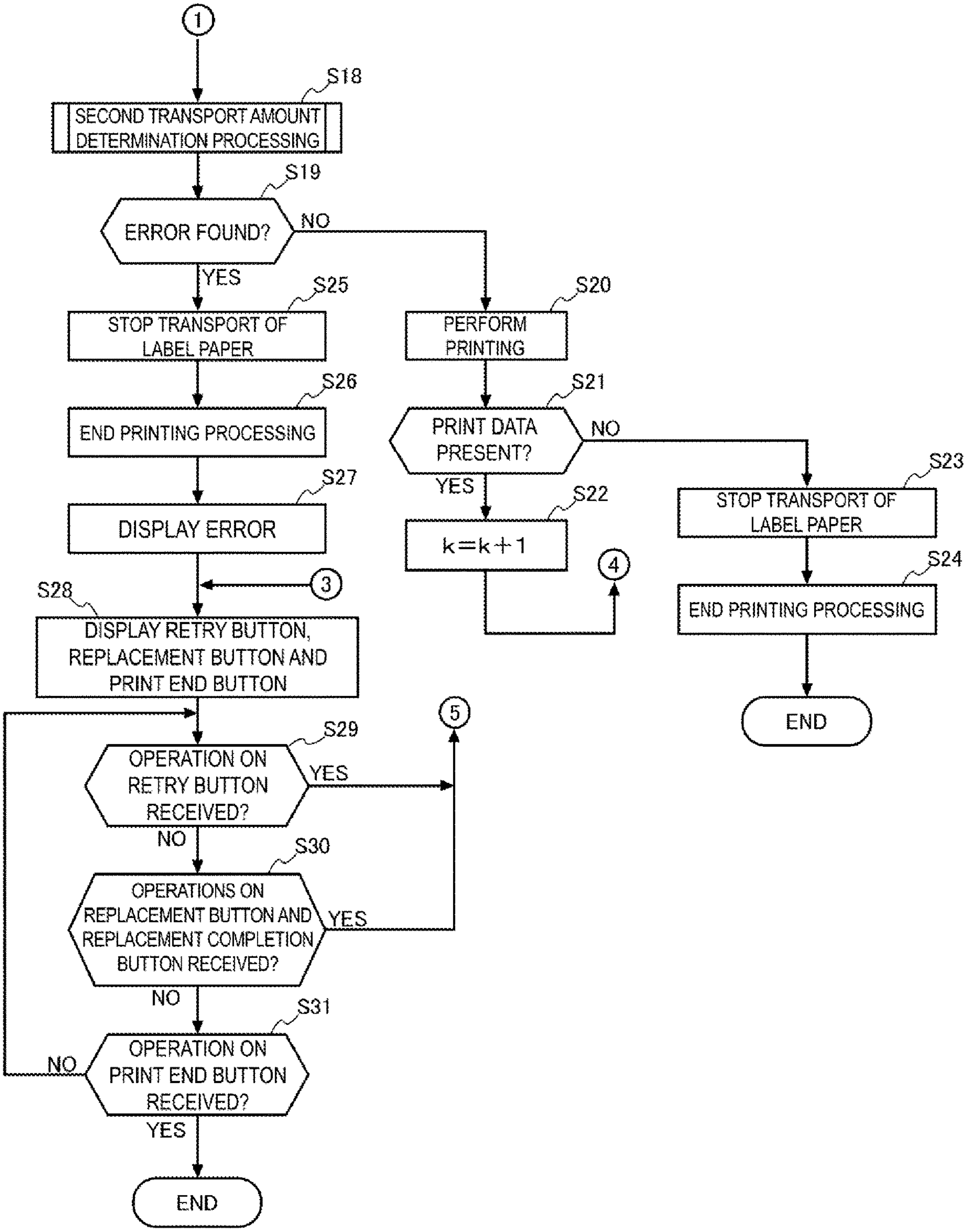
FIG. 7 is a flowchart illustrating the operation of the printing apparatus (continued).

FIGS. 6 and 7 are flowcharts illustrating overall operation of the printing apparatus 1.

The overall operation of the printing apparatus 1 will be described with reference to the flowcharts illustrated in FIGS. 6 and 7. The overall operation of the printing apparatus 1 refers to operation of a main routine of the printing apparatus 1.

The control unit 100 starts printing processing by receiving a print request from the host device (step S1). The print request includes information of image data, the number of sheets to be printed, and a set size.

Upon receiving the print request, the control unit 100 starts generation of print data for each print to be issued based on the image data included in the print request. The print data is data obtained by applying processing such as resolution conversion processing, color conversion processing, halftone processing, rasterization processing and command addition processing to the image data.

Next, the control unit 100 clears a value of a counter with zero, causes the counter after the zero clearing to count 1, and sets a value of "1" to the count value k (step S2). Next, the control unit 100 drives the transport unit 20 to transport the label paper 4 accommodated in the supply unit 10 along the transport path 27 (Step S3). Then, the control unit 100 starts detection of a label leading end by the label end detection sensor 24 (step S4).

Next, the control unit 100 determines whether the operation panel 61 receives an operation for instructing stop of the transport of the label paper 4 or not (step S5). When the operating panel 61 receives an operation for instructing the stop of the transport (Step S5/YES), the control unit 100 stops the driving of the transport unit 20 to stop the transport of the label paper 4 (Step S16), and ends the printing processing (Step S17).

Further, when the operation panel 61 does not receive an operation for instructing stop of the transport (step S5/NO), the control unit 100 determines whether the count value k of the counter is "1" or not (step S6). When the count value k of the counter is "1" (step S6/YES), the control unit 100 performs the first transport amount determination processing (step S7). That is, in a case of the leading label 3, the control unit 100 performs the first transport amount determination processing and the label size determination processing. Details of the first transport amount determination processing will be described with reference to a flowchart illustrated in FIG. 8.

Next, the control unit 100 determines whether a determination result of the first transport amount determination processing performed in step S7 is "error found" or not (step S8). When output of the first transport amount determination processing is "error found" (Step S8/YES), the control unit 100 stops the driving of the transport unit 20 to stop the transport of the label paper 4 (Step S11), and causes an error display to be displayed on the touch panel 63 (Step S12). Thereafter, the control unit 100 transits to determination in step S28 illustrated in FIG. 7 described later.

In addition, when the output of the first transport amount determination processing is "no error" (step S8/NO), the control unit 100 performs the label size determination processing next (step S9). Details of the label size determination processing will be described with reference to a flowchart illustrated in FIG. 9.

Next, the control unit 100 determines whether a determination result of the label size determination processing performed in step S9 is "error found" or not (step S10).

When the determination result of the label size determination processing is "error found" (Step S10/YES), the control unit 100 stops the driving of the transport unit 20 to stop the transport of the label paper 4 (Step S11), and causes an error display to be displayed on the touch panel 63 (Step S12). Thereafter, the control unit 100 transits to determination in step S28 illustrated in FIG. 7 described later.

In addition, when the determination result of the label size determination processing is "no error" (step S10/NO), the control unit 100 causes the printing unit 30 to print an image based on print data (step S13). Next, the control unit 100 determines whether there is print data to be printed on the next label 3 or not (step S14).

When there is print data to be printed on the next label 3 (step S14/YES), the control unit 100 adds 1 to the count value k of the counter (step S15), and returns to the determination in step S5.

Further, when there is no print data to be printed on the next label 3 (Step S14/NO), the control unit 100 stops the driving of the transport unit 20 to stop the transport of the label paper 4 (Step S16), and ends the printing processing (Step S17).

Next, operation of the printing apparatus 1 when the count value k of the counter is not "1" in step S6 will be described with reference to the flowchart illustrated in FIG. 7.

When the count value k of the counter is not "1" (step S6/NO), the control unit 100 performs the second transport amount determination processing (step S18). That is, when the label 3 is not the leading label 3 but the second label 3 or the subsequent label 3, the control unit 100 performs the second transport amount determination processing without performing the first transport amount determination processing and the label size determination processing. Details of the second transport amount determination processing will be described with reference to a flowchart illustrated in FIG. 10.

Next, the control unit 100 determines whether a determination result of the second transport amount determination processing performed in step S18 is "error found" or not (step S19). When the determination result of the second transport amount determination processing is "no error" (step S19/NO), the control unit 100 causes the printing unit 30 to print the image based on the print data (step S20). Next, the control unit 100 determines whether there is print data to be printed on the next label 3 or not (step S21).

When there is print data to be printed on the next label 3 (step S21/YES), the control unit 100 adds 1 to the count value k of the counter (step S22), and returns to the determination in step S5.

Further, when there is no print data to be printed on the next label 3 (Step S21/NO), the control unit 100 stops the driving of the transport unit 20 to stop the transport of the label paper 4 (Step S23), and ends the printing processing (Step S24).

Next, when the determination result of the second transport amount determination processing is "error found" (step S19/YES), the control unit 100 stops the driving of the transport unit 20 to stop the transport of the label paper 4 (step S25), and ends the printing processing (step S26). Thereafter, the control unit 100 causes an error display to be displayed on the touch panel 63 (step S27).

Next, operation when an error is determined in any one of the first transport amount determination processing (step S7), the label size determination processing (step S9), and the second transport amount determination processing (step S18) will be described. First, the control unit 100 causes the retry button 64, the replacement button 65 and the print end button 66 to be displayed on the touch panel 63 (step S28).

Next, the control unit 100 determines whether an operation on the retry button 64 is received or not (Step S29). When an operation on the retry button 64 is received (step S29/YES), the control unit 100 returns to the processing in step S2.

Further, when no operation on the retry button 64 is received (step S29/NO), the control unit 100 determines whether an operation on the replacement button 65 is received or not (step S30). When an operation on the replacement button 65 illustrated in FIG. 4 is received and further an operation on the replacement completion button 67 illustrated in FIG. 5 is received (step S30/YES), the control unit 100 returns to the processing in step S2.

Further, when no operation is received on the replacement button 65 and the replacement completion button 67 (step S30/NO), the control unit 100 determines whether an operation on the print end button 66 is received or not (step S31). When no operation is received on the print end button 66 (step S31/NO), the control unit 100 returns to the determination in step S29. Further, when an operation on the print end button is received (step S31/YES), the control unit 100 ends the processing flow.

Figure 8:
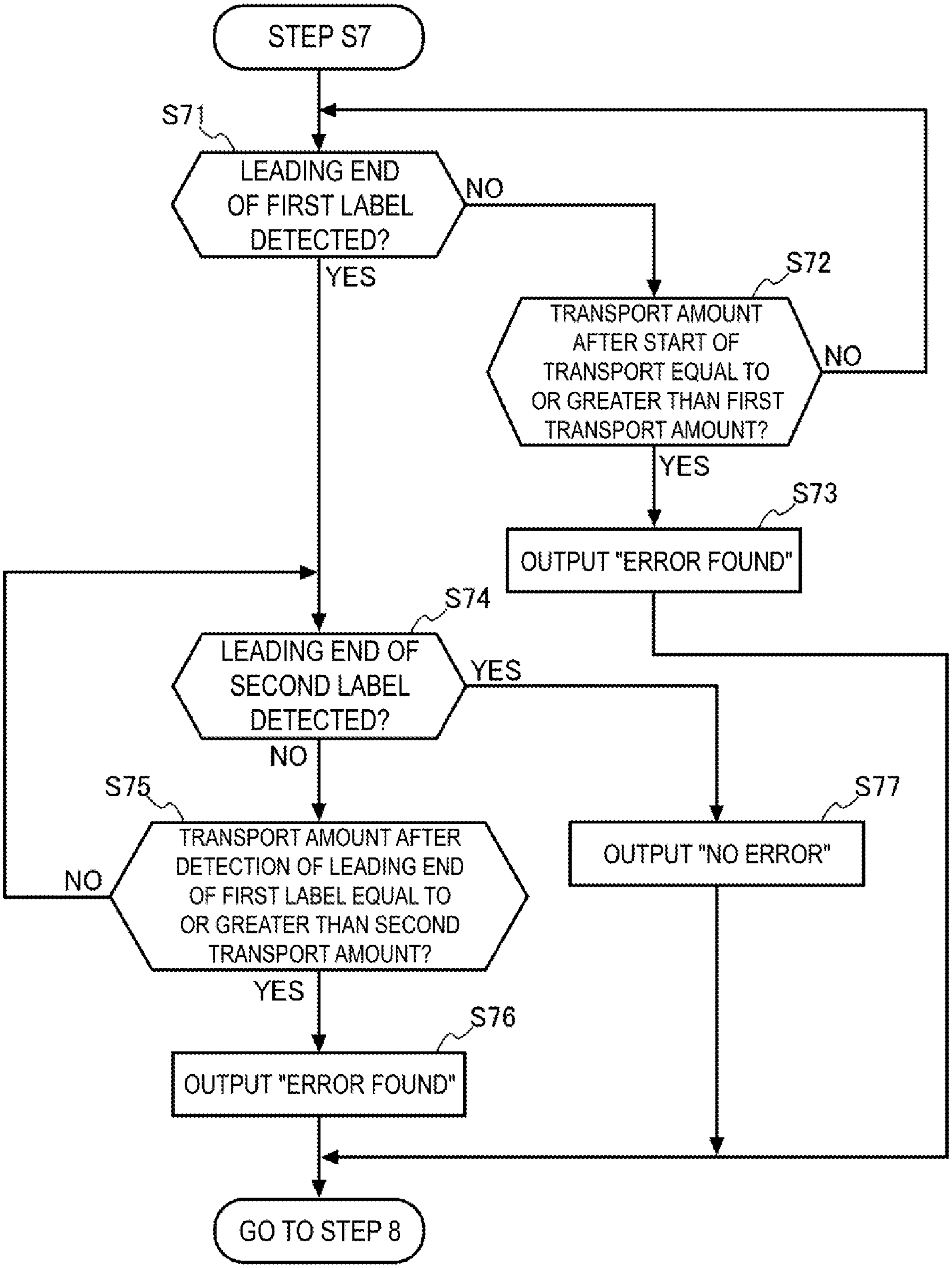
FIG. 8 is a flowchart illustrating first transport amount determination processing.

FIG. 8 is the flowchart illustrating details of the first transport amount determination processing.

The first transport amount determination processing, which is a subroutine, will be described in detail with reference to the flowchart illustrated in FIG. 8.

First, the control unit 100 determines whether the label end detection sensor 24 detects a leading end of the first label 3 or not (step S71).

When the label end detection sensor 24 does not detect a leading end of the first label 3 (Step S71/NO), the control unit 100 determines whether a transport amount after the transport unit 20 is driven and the transport of the label paper 4 is started in Step S3 is equal to or greater than the first transport amount or not (Step S72).

When the transport amount after the start of the transport of the label paper 4 is equal to or greater than the first transport amount (step S72/YES), the control unit 100 outputs "error found" as a determination result of the first transport amount determination processing (step S73), and transits to processing in step S8.

In addition, when the transport amount after the start of the transport of the label paper 4 is less than the first transport amount (step S72/NO), the control unit 100 returns to the determination in step S71 and determines whether a leading end of the first label 3 is detected or not.

When the label end detection sensor 24 detects a leading end of the first label 3 (step S71/YES), the control unit 100 then determines whether the label end detection sensor 24 detects a leading end of the second label 3 or not (step S74).

When the label end detection sensor 24 does not detect a leading end of the second label 3 (step S74/NO), the control unit 100 determines whether a transport amount after the leading end of the first label 3 is detected is equal to or greater than the second transport amount or not (step S75).

When the transport amount after the leading end of the first label 3 is detected is equal to or greater than the second transport amount (step S75/YES), the control unit 100 outputs "error found" as the determination result of the first transport amount determination processing (step S76), and transits to the processing in step S8.

In addition, when the transport amount after the leading end of the first label 3 is detected is less than the second transport amount (step S75/NO), the control unit 100 returns to the determination in step S74 and determines whether a leading end of the second label 3 is detected or not.

In addition, when the label end detection sensor 24 detects a leading end of the second label 3 (Step S74/YES), the control unit 100 outputs "no error" as the determination result of the first transport amount determination processing (Step S77), and transits to the processing in Step S8. That is, in a case where the transport amount of the label paper 4 is less than the second transport amount, when a leading end of the second label 3 is detected, the control unit 100 outputs "no error" as the determination result of the first transport amount determination processing and transits to the processing in step S8.

Figure 9:
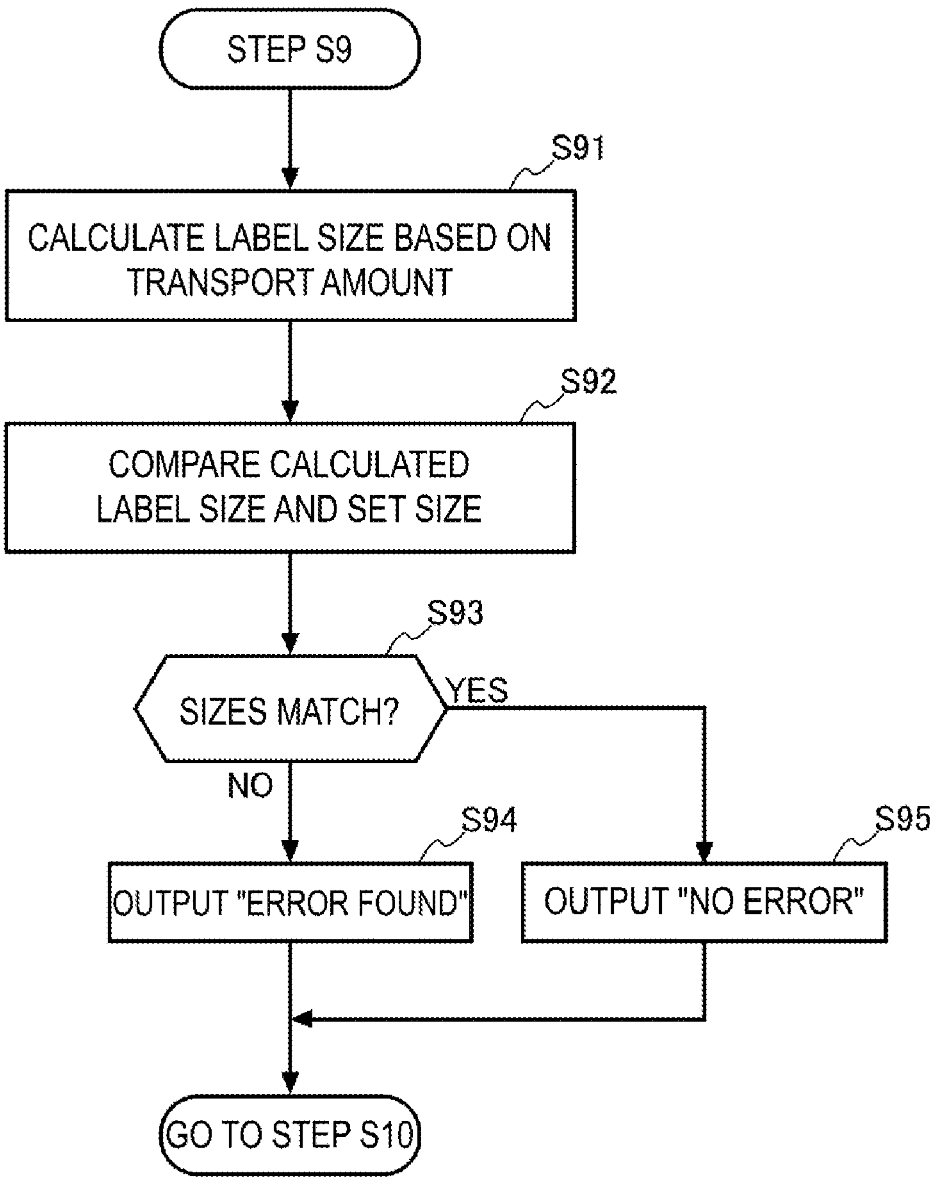
FIG. 9 is a flowchart illustrating label size determination processing.

FIG. 9 is the flowchart illustrating details of the label size determination processing.

The label size determination processing which is a subroutine will be described in detail with reference to the flowchart illustrated in FIG. 9.

First, when the output of the first transport amount determination processing is "no error" (step S8/NO), the control unit 100 calculates a size of the first label 3 based on the transport amount of the label paper 4 from the detection of the leading end of the first label 3 to the detection of the leading end of the second label 3 (step S91).

Next, the control unit 100 compares the size of the label 3 calculated in step S91 with the set size set in the print request (step S92).

When the size of the label 3 calculated in step S92 does not match the set size (step S93/NO), the control unit 100 outputs "error found" as the determination result of the label size determination processing (step S94), and transits to processing of step S10.

Further, when the size of the label 3 calculated in step S91 matches the set size (step S93/YES), the control unit 100 outputs "no error" as the determination result of the label size determination processing (step S95), and transits to the processing in step S10.

Figure 10:
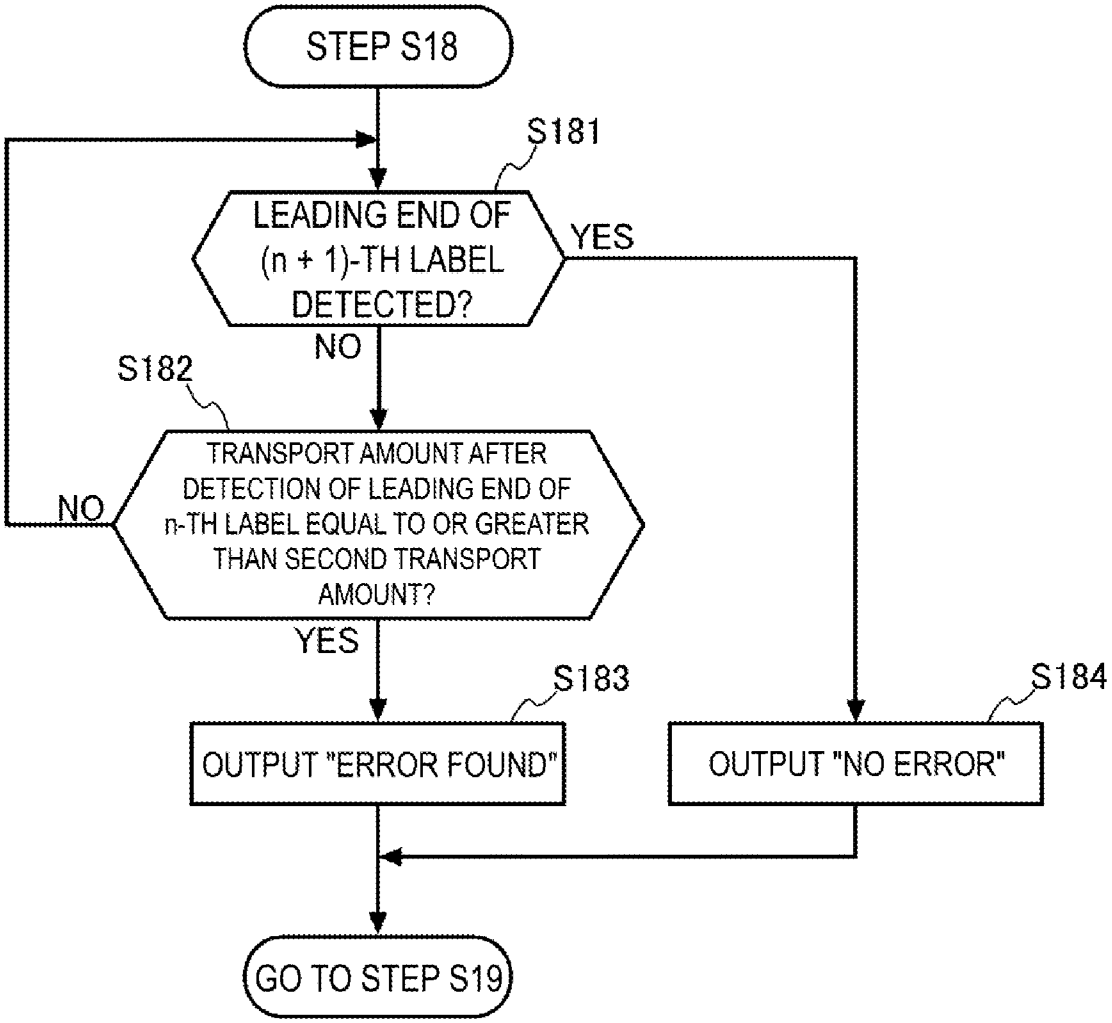
FIG. 10 is a flowchart illustrating second transport amount determination processing.

FIG. 10 is the flowchart illustrating details of the second transport amount determination processing.

The second transport amount determination processing, which is a subroutine, will be described in detail with reference to the flowchart illustrated in FIG. 10.

The control unit 100 determines whether the label end detection sensor 24 detects a leading end of the (n+1)-th label 3 or not (step S181). When a leading end of the (n+1)-th label 3 is not detected (step S181/NO), the control unit 100 determines whether a transport amount of the label paper 4 after a leading end of the n-th label 3 immediately before the (n+1)-th label 3 is detected is equal to or greater than the second transport amount or not (step S182). When the transport amount of the label paper 4 after the leading end of the n-th label 3 is detected is less than the second transport amount (Step S182/NO), the control unit 100 returns to the determination in Step S181.

When the transport amount after the leading end of the n-th label 3 is detected is equal to or greater than the second transport amount (Step S182/YES), the control unit 100 outputs "error found" as the determination result of the second transport amount determination processing (Step S183). Thereafter, the control unit 100 transits to determination in step S19.

Further, when a leading end of the (n+1)-th label 3 is detected (Step S181/YES), the control unit 100 outputs "no error" as the determination result of the second transport amount determination processing (Step S184), and transits to the processing in Step S19. That is, in a case where the transport amount of the label paper 4 is less than the second transport amount, when a leading end of the (n+1)-th label 3 is detected, the control unit 100 outputs "no error" as the determination result of the second transport amount determination processing and transits to the processing in step S19.

In the flowcharts illustrated in FIGS. 6 to 10, step S3 corresponds to a transport step.

Step S4 corresponds to a label end detection step.

Step S13 corresponds to a printing step.

Step S9 and the flowchart illustrated in FIG. 9 correspond to a label size determination processing step.

Step S11 corresponds to stopping of the transport of the label medium when it is determined by the label size determination step that the size of the leading label does not match the set size.

The case where the determination in step S10 is negative, 1 is added to the count value k of the counter by step S15, and then the determination in step S6 is negative corresponds to a case where the label size determination processing is not performed on a label subsequent to the leading label when it is determined by the label size determination step that the size of the leading label matches the set size.

4. Summary of Present Disclosure

A summary of the present disclosure will be appended below.

APPENDIX 1

A printing apparatus including a transport unit configured to transport a label medium in which a plurality of labels are attached to a liner along a transport path in a transport direction, a label end detection unit configured to detect an end portion of each of the plurality of labels attached to the label medium transported on the transport path, a printing unit disposed downstream of the label end detection unit in the transport direction and configured to print an image based on image data on each of the plurality of labels, and a control unit configured to perform, after a print request received from an external device is received, based on a detection result of the label end detection unit, a label size determination processing of determining, for a leading label on which the image based on the image data included in the print request is printed first, whether a size of the leading label matches a set size set in the print request or not, wherein the control unit, when it is determined by the label size determination processing that the size of the leading label does not match the set size, causes the transport unit to stop the transport of the label medium, and when it is determined by the label size determination processing that the size of the leading label matches the set size, does not perform the label size determination processing on a label subsequent to the leading label.

According to this configuration, when the size of the leading label does not match the set size, the transport of the label medium is stopped, and when the size of the leading label matches the set size, the label size determination processing is not performed on a label subsequent to the leading label.

Therefore, when a user intentionally peels off a label from the liner, it is possible to reduce occurrence of an event in which a determination result of the label size determination processing is "error" and printing of the label is stopped in the middle. For this reason, it is possible to improve usability of the printing apparatus when printing is performed on the label medium from which some of the labels are peeled off.

APPENDIX 2

The printing apparatus according to Appendix 1, including a transport amount detection unit configured to detect a transport amount of the label medium transported on the transport path, wherein the control unit performs the label size determination processing based on a transport amount of the label medium transported during a period from when the label end detection unit detects a leading end portion of the leading label to when the label end detection unit detects a leading end portion of a label subsequent to the leading label.

According to this configuration, the label size determination processing on the leading label is performed based on the transport amount of the label medium that is transported while the leading end portion of the leading label and the leading end portion of the label subsequent to the leading label are detected. Therefore, it is possible to perform the label size determination processing with high accuracy with a simple configuration.

APPENDIX 3

The printing apparatus according to Appendix 1, including a transport amount detection unit configured to detect a transport amount of the label medium transported on the transport path, wherein the control unit performs the label size determination processing based on a transport amount of the label medium transported during a period from when the label end detection unit detects a leading end portion of the leading label to when the label end detection unit detects a trailing end portion of the leading label.

According to this configuration, the label size determination processing on the leading label is performed by detecting the leading end portion and the trailing end portion of the leading label. Therefore, it is possible to perform the label size determination processing with high accuracy with a simple configuration.

APPENDIX 4

The printing apparatus according to Appendix 2 or 3, wherein even in a case where the label medium is transported by a preset first transport amount or more after the print request is received and transport of the label medium is started by the transport unit, when the label end detection unit fails to detect the leading end portion of the leading label, the control unit causes the transport unit to stop the transport of the label medium.

According to this configuration, even in a case where the label medium is transported by the first transport amount or more, when a leading end portion of the leading label cannot be detected, it is possible to stop the transport of the label medium.

Accordingly, when an unexpected error occurs and a leading end portion of the leading label cannot be detected, it is possible to stop the transport of the label medium.

APPENDIX 5

The printing apparatus according to Appendix 2 or 3, wherein even in a case where the label medium is transported by a preset second transport amount or more after the label end detection unit detects the leading end portion of the leading label, when it fails to detect a label leading end portion next to the leading label, the control unit causes the transport unit to stop the transport of the label medium.

According to this configuration, even in a case where the transport amount after the end portion of the leading label is detected becomes equal to or greater than the second transport amount, when a label subsequent to the leading label cannot be detected, the transport of the label medium is stopped. Accordingly, when an unexpected error occurs and a label subsequent to the leading label cannot be detected, it is possible to stop the transport of the label medium.

APPENDIX 6

The printing apparatus according to any one of Appendices 2 to 5, wherein even in a case where the label medium is transported by a preset third transport amount or more after the print request is received, the transport unit starts the transport of the label medium, and a leading end portion of an n-th label, where n is a natural number of 2 or more, that the label end detection unit detects in n-th detection is detected, when the label end detection unit fails to detect a leading end of an (n+1)-th label subsequent to the n-th label, the control unit causes the transport unit to stop the transport of the label medium.

According to this configuration, even in a case where the transport amount after the leading end portion of the n-th label is detected becomes equal to or greater than the third transport amount, when a leading end portion of the (n+1)-th label cannot be detected, the transport of the label medium is stopped. Accordingly, when an unexpected error occurs and a leading end portion of the (n+1)-th label cannot be detected, it is possible to stop the transport of the label medium.

APPENDIX 7

The printing apparatus according to any one of Appendices 1 to 6, including a reception unit configured to receive an operation, wherein the control unit resumes the transport of the label medium by the transport unit and the detection of the end portion of the label by the label end detection unit when the reception unit receives an operation of instructing resumption of printing after stopping the transport of the label medium, performs the label size determination processing on a leading label that the label end detection unit detects first after the transport of the label medium is resumed, causes the transport unit to stop the transport of the label medium when it is determined that the size of the leading label does not match the set size, and does not perform the label size determination processing on a label subsequent to the leading label, when it is determined that the size of the leading label matches the set size.

According to this configuration, it is possible to resume transport of a label paper and the label size determination processing when the reception unit receives the operation of instructing the resumption of the printing after the transport of the label medium is stopped based on the determination result of the label size determination processing.

Therefore, even when an unexpected error occurs and the transport of the label paper is stopped by the label size determination processing and the printing is stopped, it is possible to resume the transport of the label paper and the label size determination processing by inputting the operation of instructing the resumption of the printing.

APPENDIX 8

A method of controlling a printing apparatus including a transport step for transporting a label medium in which a plurality of labels are attached to a liner along a transport path in a transport direction, a label end detection step for detecting an end portion of each of the plurality of labels attached to the label medium transported on the transport path, a printing step for, downstream in the transport direction of a position where the end portion of each of the plurality of labels is detected, printing an image based on image data on each of the plurality of labels, and a label size determination step for determining, after a print request received from an external device is received, based on a detection result of the label end detection step, for a leading label on which the image based on the image data included in the print request is printed first, whether a size of the leading label matches a set size set in the print request or not, wherein when it is determined by the label size determination step that the size of the leading label does not match the set size, the transport of the label medium is stopped, and when it is determined by the label size determination step that the size of the leading label matches the set size, the label size determination step is not performed on a label subsequent to the leading label.

According to this configuration, when the size of the leading label does not match the set size, the transport of the label medium is stopped, and when the size of the leading label matches the set size, the label size determination processing is not performed on a label subsequent to the leading label. Therefore, when a user intentionally peels off a label from the liner, it is possible to reduce occurrence of a problem in which the determination result of the label size determination processing is "error" and printing of the label is stopped in the middle. For this reason, it is possible to improve usability of the printing apparatus when printing is performed on the label medium from which some of the labels are peeled off.

5. Other Aspects

The embodiment described above is a preferred embodiment of the present disclosure. However, the present disclosure is not limited to the above-described embodiment, and various modifications can be performed without departing from the purpose of the present disclosure.

For example, in the above-described embodiment, the size of the first label 3 is calculated based on the transport amount from when the label end detection sensor 24 detects the leading end of the first label 3 to when the label end detection sensor 24 detects the leading end of the second label 3.

However, a leading end and a trailing end of the label 3 can also be detected using a transmission-type sensor. In this case, the size of the first label 3 can be calculated based on a transport amount from when the label end detection sensor 24 detects the leading end of the label 3 to when the label end detection sensor 24 detects the trailing end of the label 3.

Further, the functional units of the printing apparatus 1 illustrated in FIG. 1 represent the functional configuration, and do not particularly limit a specific implementation. In other words, hardware that corresponds individually to each of the functional units is not necessarily implemented, and a configuration in which a single processor executes a program to realize the functions of a plurality of functional units is of course adoptable. Furthermore, some of the functions realized by software may be realized by hardware, or some of the functions realized by hardware may be realized by software in the above-described embodiments. In addition, the specific details of other parts of the printing apparatus 1 may be modified as desired within the spirit of the present disclosure.

In addition, the processing units of the flowcharts illustrated in FIGS. 6 to 10 are set by dividing the processing according to the main processing content in order to facilitate understanding of the processing in the printing apparatus 1. The present disclosure is not limited by the way of dividing the processing unit illustrated in the flowchart of FIGS. 6 to 10 or the name of the processing. In addition, the processing of the printing apparatus 1 can be divided into more processing units in accordance with the processing content, and can be divided such that one processing unit includes more processing operations. In addition, the order of the processing in the above-described flowchart is not limited to the illustration of the drawings.

In addition, when a method of controlling a printing apparatus is achieved by a computer included in the printing apparatus 1, a program to be executed by the computer may be configured in an aspect of a recording medium or a transmission medium that transmits the program. As the recording medium, magnetic and optical recording mediums or semiconductor memory devices may be used. Specifically, the recording medium described above may be a portable or fixed recording medium, such as a flexible disk, a hard disk drive (HDD), a CD-ROM, a DVD, a Blu-ray disc, a magneto-optical disk, a flash memory, or a card-type recording medium. Blue-ray is a registered trademark.

What is claimed is:

1. A printing apparatus, comprising:

a transport unit configured to transport a label medium, in which a plurality of labels are attached to a liner, along a transport path in a transport direction, a label end detection unit configured to detect an end portion of each of the plurality of labels attached to the label medium transported on the transport path, a printing unit disposed downstream of the label end detection unit in the transport direction and configured to print an image based on image data on each of the plurality of labels, and a control unit configured to perform, after a print request received from an external device is received, based on a detection result of the label end detection unit, a label size determination processing of determining, for a leading label on which the image based on the image data included in the print request is printed first, whether a size of the leading label matches a set size set in the print request or not, wherein the control unit, when it is determined by the label size determination processing that the size of the leading label does not match the set size, causes the transport unit to stop the transport of the label medium, and when it is determined by the label size determination processing that the size of the leading label matches the set size, does not perform the label size determination processing on a label subsequent to the leading label.

2. The printing apparatus according to claim 1, comprising a transport amount detection unit configured to detect a transport amount of the label medium transported on the transport path, wherein the control unit performs the label size determination processing based on the transport amount of the label medium transported during a period from when the label end detection unit detects a leading end portion of the leading label to when the label end detection unit detects a leading end portion of a label subsequent to the leading label.

3. The printing apparatus according to claim 1, comprising a transport amount detection unit configured to detect a transport amount of the label medium transported on the transport path, wherein the control unit performs the label size determination processing based on a transport amount of the label medium transported during a period from when the label end detection unit detects a leading end portion of the leading label to when the label end detection unit detects a trailing end portion of the leading label.

4. The printing apparatus according to claim 2, wherein even in a case where the label medium is transported by a preset first transport amount or more after the print request is received and transport of the label medium is started by the transport unit, when the label end detection unit fails to detect the leading end portion of the leading label, the control unit causes the transport unit to stop the transport of the label medium.

5. The printing apparatus according to claim 2, wherein even in a case where the label medium is transported by a preset second transport amount or more after the label end detection unit detects the leading end portion of the leading label, when it fails to detect a label leading end portion next to the leading label, the control unit causes the transport unit to stop the transport of the label medium.

6. The printing apparatus according to claim 2, wherein even in a case where the label medium is transported by a preset third transport amount or more after the print request is received, the transport unit starts the transport of the label medium, and a leading end portion of an n-th label, where n is a natural number of 2 or more, that the label end detection unit detects in n-th detection is detected, when the label end detection unit fails to detect a leading end of an (n+1)-th label subsequent to the n-th label, the control unit causes the transport unit to stop the transport of the label medium.

7. The printing apparatus according to claim 1, comprising a reception unit configured to receive an operation, wherein the control unit resumes the transport of the label medium by the transport unit and the detection of the end portion of the label by the label end detection unit when the reception unit receives an operation of instructing resumption of printing after stopping the transport of the label medium, performs the label size determination processing on a leading label that the label end detection unit detects first after the transport of the label medium is resumed, causes the transport unit to stop the transport of the label medium when it is determined that the size of the leading label does not match the set size, and does not perform the label size determination processing on a label subsequent to the leading label, when it is determined that the size of the leading label matches the set size.

8. A method of controlling a printing apparatus, comprising:

a transport step for transporting a label medium, in which a plurality of labels are attached to a liner, along a transport path in a transport direction, a label end detection step for detecting an end portion of each of the plurality of labels attached to the label medium transported on the transport path, a printing step for, downstream in the transport direction of a position where the end portion of each of the plurality of labels is detected, printing an image based on image data on each of the plurality of labels, and a label size determination step for determining, after a print request received from an external device is received, based on a detection result of the label end detection step, for a leading label on which the image based on the image data included in the print request is printed first, whether a size of the leading label matches a set size set in the print request or not, wherein when it is determined by the label size determination step that the size of the leading label does not match the set size, the transport of the label medium is stopped, and when it is determined by the label size determination step that the size of the leading label matches the set size, the label size determination step is not performed for a label subsequent to the leading label.

* * * * *